United States Patent
Arai et al.

(10) Patent No.: US 7,792,016 B2
(45) Date of Patent: Sep. 7, 2010

(54) NETWORK RELAY DEVICE FOR RELAYING DATA IN A NETWORK AND CONTROL METHOD FOR THE SAME

(75) Inventors: Masaya Arai, Atsugi (JP); Shinji Nozaki, Kawasaki (JP); Takahisa Miyamoto, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 813 days.

(21) Appl. No.: 11/366,837

(22) Filed: Mar. 3, 2006

(65) Prior Publication Data

US 2007/0047436 A1 Mar. 1, 2007

(30) Foreign Application Priority Data

Aug. 24, 2005 (JP) .............................. 2005-242001

(51) Int. Cl.
*G06F 11/07* (2006.01)
(52) U.S. Cl. ........................... 370/217; 370/242; 714/4; 709/209
(58) Field of Classification Search ......... 370/216–228, 370/241–248, 254, 386, 392; 714/1–4, 10–13, 714/36, 55; 455/423, 428; 709/203, 208, 709/209; 398/1–8
See application file for complete search history.

(56) References Cited

U.S. PATENT DOCUMENTS 5,473,599 A 12/1995 Li et al.
7,197,660 B1* 3/2007 Liu et al. .................... 714/4
7,209,435 B1* 4/2007 Kuo et al. ................... 370/219
2001/0034228 A1* 10/2001 Lehtovirta et al. .......... 455/424
2005/0276215 A1* 12/2005 Kitani et al. ................ 370/217

FOREIGN PATENT DOCUMENTS

JP 2001-344125 12/2001
JP 2005-130049 5/2005

* cited by examiner

*Primary Examiner*—Aung S Moe
*Assistant Examiner*—Habte Mered
(74) *Attorney, Agent, or Firm*—McDermott Will & Emery LLP

(57) ABSTRACT

In the case of detection of failure on a direct link interconnecting Master and Backup upstream switches, a control module of the Master upstream switch sends a partial failure message representing the occurrence of partial failure in the Master upstream switch via any of multiple lines connected to multiple ports of the Master upstream switch to the Backup upstream switch. Upon reception of the partial failure message from the Master upstream switch, a control module of the Backup upstream switch identifies partial failure occurring in the Master upstream switch and keeps the Backup operating status of the Backup upstream switch. Upon no reception of the partial failure message from the Master upstream switch, on the other hand, the control module of the Backup upstream switch identifies total failure occurring in the Master upstream switch and switches over the operating status of the Backup upstream switch from Backup to Master. In the event of failure occurring in the Master upstream switch, this arrangement effectively prevents unintentional interruption of data communication but ensures normal data communication in a network without causing the double-master state and the control loop in the network.

4 Claims, 11 Drawing Sheets

NETWORK RELAY DEVICE FOR RELAYING DATA IN A NETWORK AND CONTROL METHOD FOR THE SAME

The present application claims priority from Japanese application JP2005-242001 filed on Aug. 24, 2005, the content of which is hereby incorporated by reference into this application.

BACKGROUND OF THE INVENTION

1. Field of the Invention

The present invention relates to a network relay device that relays data in a network.

2. Description of the Related Art

Networks generally adopt the policy of redundancy to prevent the unintentional stop of the functions in the whole network due to some failures occurring on lines and respective devices.

Layer 2 (data link layer) and Layer 3 (network layer) in an OSI reference model have some differences in network characteristics. In Internet Protocol (IP) as a typical example of Layer 3, data communication is disabled between devices interconnected via a line, unless IP addresses are allocated to the respective devices. In Ethernet (registered trademark) as a typical example of Layer 2, data communication is enabled between devices interconnected via a line.

A Layer 2 switch (hereafter referred to as L2 switch) is a typical example of a Layer 2 network relay device. Interconnection of L2 switches via multiple lines or adoption of the redundancy policy in multiple L2 switches may cause a loop in a network.

In packet transmission on the Ethernet (registered trademark), the L2 switch sends a packet having an unknown MAC address (unknown receiver) via all lines except a packet receiving line. The L2 switch is, however, incapable of storing the transmitted packet. The presence of a loop in the network causes endless circles of packet transmission and imposes a significant load on the packet transfer by the L2 switch. This may adversely affect other networks and occupy the circuit capacity.

A proposed countermeasure against this problem divides multiple lines and multiple L2 switches in the loop into the active system and the standby system. The standby system blocks the packet transfer by the L2 switch and sets the lines in logic disconnection, while only the L2 switch and the lines of the active system are used for data communication. This prevents a loop in the network.

The active system and the standby system are determined for each group of a single virtual LAN or of multiple virtual LANs. The L2 switch and the lines specified as the active system in one group of virtual LANs may thus be specified as the standby system in another group of virtual LANs, or vice versa.

The conventionally known structure uses a pair of L2 switches that are interlinked to switch over their operating statues between Master and Backup. This structure enable a quick switchover of the operation subject from the active system to the standby system in the event of some failure.

One of the two L2 switches is set in the Master operating status to be used as the active system (hereafter may be referred to as the Master switch), while the other L2 switch is set in the Backup operating status to be used as the standby system (hereafter may be referred to as the Backup switch). The Master switch opens ports and sets physically connected lines to logic connection to enable data communication. The Backup switch, on the other hand, blocks ports and sets physically connected lines to logic disconnection to disable data communication. During the operations, the Master switch and the Backup switch exchange control messages at regular intervals via a direct link to verify the mutual survivals. In the event of failure occurring in the Master switch or in any of the lines connected to the Master switch, the Backup switch detects the occurrence of the failure and switches over its operating status from Backup to Master. The Backup switch accordingly opens the blocked ports and changes the connection state of the physically connected lines to logic connection to enable data communication. The operation subject of the network is thus switched over from the active system to the standby system.

The relevant network technique is disclosed, for example, in U.S. Pat. No. 5,473,599.

SUMMARY OF THE INVENTION

The Master switch and the Backup switch exchange control messages at regular intervals via the direct link to verify the mutual survivals as mentioned above. In the event of failure occurring on at least the direct link, the Backup switch detects the occurrence of failure on the direct link but can not accurately identify whether the failure occurring in the Master switch is total failure or partial failure. The total failure in the Master switch represents the full malfunction of the whole Master switch or the occurrence of failures in all the lines connected to the Master switch. The partial failure in the Master switch represents the occurrence of failure on the direct line and the occurrence of failure in at least one of the lines connected to the Master switch other than the direct link. The total failure in the Master switch disables data communication by all the lines connected to the Master switch. The partial failure in the Master switch, however, enables data communication by at least one of the lines connected to the Master switch other than the direct link.

In the event of partial failure occurring in the Master switch, at least one of the lines connected to the Master switch other than the direct link is still active to enable data communication. If the Backup switch immediately switches over its operating status from Backup to Master in response to detection of the occurrence of failure on the direct link, the two L2 switches are simultaneously set in the Master operating status. In this double-master state, the Backup switch opens the blocked ports and changes the connection state of the physically connected lines to logic connection to enable data communication, while the Master switch with the partial failure still enables data communication. The data communication by these two L2 switches both set in the Master operating status undesirably causes a loop in the network.

In the event of total failure occurring in the Master switch, on the other hand, all the lines connected to the Master switch are incapable of data communication. If the Backup switch does not switch over its operating status from Backup to Master but keeps the Backup operating status regardless of detection of failure on the direct link, there is no data communication in the network. In this state, the Backup switch keeps the ports blocked and the connection state of the physically connected lines in logic disconnection to disable data communication, while the Master switch with the total failure disables data communication. Both the L2 switches disable data transmission and thus interrupt data communication in the network.

The object of the invention is thus to provide a technique of, in the event of failure occurring in a master switch, preventing unintentional interruption of data communication but continuing normal data communication in a network without causing the double-master state and the control loop in the network.

In order to attain at least part of the above and the other related objects, the present invention is directed to a first network relay device that has multiple ports and works to relay data in a network, in combination with at least one specific network device among multiple network devices linked to the multiple ports via multiple lines. The first network relay device includes: a control module that receives and sends control messages from and to the specific network device via a direct link and switches over an operating status of the network relay device between master and backup; and a communication module that is under control of the control module and, in the master operating status of the network relay device, sets a connection status of the multiple lines connected with the multiple ports to logic connection to enable transmission of both messages and the data, while in the backup operating status of the network relay device, setting the connection status of the multiple lines connected with the multiple ports to logic disconnection to enable only transmission of messages but disable transmission of the data.

In the case of detection of failure on the direct link in the backup operating status of the network relay device, the control module verifies reception of a partial failure message representing occurrence of partial failure in the specific network device from the specific network device via any of the multiple lines linked to the multiple ports and identifies partial failure occurring in the specific network device.

In the first network relay device of the invention, in the case of detection of failure on the direct link in the backup operating status of the network relay device, the control module verifies reception of the partial failure message representing occurrence of partial failure in the specific network device from the specific network device via any of the multiple lines linked to the multiple ports and identifies partial failure occurring in the specific network device. The first network relay device does not immediately switch over its operating status from backup to master but keeps the backup operating status, while the specific network device is kept in the master operating status. This arrangement effectively prevents the double-master state and the control loop in the network.

In one preferable embodiment of the first network relay device of the invention, upon identification of the partial failure occurring in the specific network device, the control module keeps the backup operating status of the network relay device.

In the event of partial failure occurring in the specific network device, the specific network device set in the master operating status can receive and send data via a normal line free from the effect of the failure. The first network relay device of this embodiment keeps the backup operating status. This arrangement desirably ensures continuous data communication without causing the double-master state.

In another preferable embodiment of the first network relay device of the invention, upon identification of the partial failure occurring in the specific network device, the control module sends a switchover message to the specific network device to urge a switchover of an operating status of the specific network device from master to backup via a line connected to a port receiving the partial failure message, receives a return message from the specific network device, and switches over the operating status of the network relay device from backup to master.

The first network relay device of this embodiment causes the specific network device set in the master operating status to switch over its operating status from master to backup and subsequently switches over the operating status of the first network relay device from backup to master. This arrangement effectively avoids the double-master state and uses the first network relay device as the new master to enable continuous data communication.

The present invention is also directed to a second network relay device that has multiple ports and works to relay data in a network, in combination with at least one specific network device among multiple network devices linked to the multiple ports via multiple lines. The second network relay device includes: a control module that receives and sends control messages from and to the specific network device via a direct link and switches over an operating status of the network relay device between master and backup; and a communication module that is under control of the control module and, in the master operating status of the network relay device, sets a connection status of the multiple lines connected with the multiple ports to logic connection to enable transmission of both messages and the data, while in the backup operating status of the network relay device, setting the connection status of the multiple lines connected with the multiple ports to logic disconnection to enable only transmission of messages but disable transmission of the data.

In the backup operating status of the network relay device, the control module identifies each type of the multiple network devices linked to the multiple ports via the multiple lines as either of a first network device with a failure detection function of detecting failure occurring in the specific network device and a second network device without the failure detection function and specifies number of the identified first network devices and number of the identified second network devices. In the case of detection of failure on the direct link under the condition that the specified number of the second network devices is equal to zero, the control module verifies reception of a failure occurrence message representing occurrence of failure in the specific network device from all the specified number of the identified first network devices via respective lines connected to relevant ports and identifies total failure occurring in the specific network device.

The second network relay device set in the backup operating status identifies each type of the multiple network devices linked to the multiple ports via the multiple lines as either of the first network device with the failure detection function of detecting failure occurring in the specific network device and the second network device without the failure detection function and specifies the number of the identified first network devices and the number of the identified second network devices. When the specified number of the identified second network devices is equal to zero, the second network relay device recognizes all the multiple network devices linked to the multiple ports via the multiple lines as the first network devices. In the case of detection of failure on the direct link, the control module receives the failure occurrence message representing occurrence of failure in the specific network device from all the specified number of the identified first network devices via the respective lines connected to the relevant ports. The second network relay device then verifies notification of the failure occurring in the specific network device from all the multiple network devices linked to the multiple ports via the multiple lines. The second network relay device accurately identifies total failure occurring in the specific network device, based on the verification. The second network relay device then switches over its operating status from backup to master and thus ensures continuous data communication in the network The invention is also directed to a third network relay device that has multiple ports and works to relay data in a network, in combination with at least one specific network device among multiple network devices linked to the multiple ports via multiple lines. The third network relay device includes: a control module that receives and sends control messages from and to the specific network device via a direct link and switches over an operating status of the network relay device between master and backup; and a communication module that is under control of the control module and, in the master operating status of the network relay device, sets a connection status of the multiple lines connected with the multiple ports to logic connection to enable transmission of both messages and the data, while in the backup operating status of the network relay device, setting the connection status of the multiple lines connected with the multiple ports to logic disconnection to enable only transmission of messages but disable transmission of the data.

In the backup operating status of the network relay device, the control module identifies each type of the multiple network devices linked to the multiple ports via the multiple lines as either of a first network device with a failure detection function of detecting failure occurring in the specific network device and a second network device without the failure detection function and specifies number of the identified first network devices and number of the identified second network devices. In the case of detection of failure on the direct line under the condition that the specified number of the identified first network devices is equal to zero, the control module identifies total failure occurring in the specific network device when no message is received via any of the multiple lines connected to the multiple ports within a preset time elapsed since a predetermined reference timing.

The third network relay device set in the backup operating status identifies each type of the multiple network devices linked to the multiple ports via the multiple lines as either of the first network device with the failure detection function of detecting failure occurring in the specific network device and the second network device without the failure detection function and specifies the number of the identified first network devices and the number of the identified second network devices. When the specified number of the identified first network devices is equal to zero, the third network relay device recognizes all the multiple network devices linked to the multiple ports via the multiple lines as the second network devices. In the case of detection of failure on the direct link, the control module receives no message via any of the multiple lines connected with the multiple ports within the preset time elapsed since the predetermined reference timing. The third network relay device thus verifies no transmission of messages from the specific network device via any of the second network devices. The third network relay device accurately identifies total failure occurring in the specific network device, based on the verification. The third network relay device then switches over its operating status from backup to master and thus ensures continuous data communication in the network.

The invention is also directed to a fourth network relay device that has multiple ports and works to relay data in a network, in combination with at least one specific network device among multiple network devices linked to the multiple ports via multiple lines. The fourth network relay device includes: a control module that receives and sends control messages from and to the specific network device via a direct link and switches over an operating status of the network relay device between master and backup; and a communication module that is under control of the control module and, in the master operating status of the network relay device, sets a connection status of the multiple lines connected with the multiple ports to logic connection to enable transmission of both messages and the data, while in the backup operating status of the network relay device, setting the connection status of the multiple lines connected with the multiple ports to logic disconnection to enable only transmission of messages but disable transmission of the data.

In the backup operating status of the network relay device, the control module identifies each type of the multiple network devices linked to the multiple ports via the multiple lines as either of a first network device with a failure detection function of detecting failure occurring in the specific network device and a second network device without the failure detection function and specifies number of the identified first network devices and number of the identified second network devices. In the case of detection of failure on the direct link, the control module verifies reception of a failure occurrence message representing occurrence of failure in the specific network device from all the specified number of the identified first network devices via lines connected to the first network devices among the multiple lines connected to the multiple ports and reception of no message via residual lines other than the lines connected to the identified first network devices within a preset time elapsed since a predetermined reference timing, and identifies total failure occurring in the specific network device, based on the verification.

The fourth network relay device set in the backup operating status identifies each type of the multiple network devices linked to the multiple ports via the multiple lines as either of the first network device with the failure detection function of detecting failure occurring in the specific network device and the second network device without the failure detection function and specifies the number of the identified first network devices and the number of the identified second network devices. In the case of detection of failure on the direct link, the control module receives the failure occurrence message representing occurrence of failure in the specific network device from all the specified number of the identified first network devices via the lines connected to the first network devices among the multiple lines connected to the multiple ports. The fourth network relay device thus verifies notification of the failure occurring in the specific network device from all the specified number of the first network devices with the failure detection function among the multiple network devices linked to the multiple ports via the multiple lines. The control module receives no message via the residual lines other than the lines connected to the identified first network devices within the preset time elapsed since the predetermined reference timing. The fourth network relay device thus verifies no transmission of messages from the specific network device via any of the second network devices without the failure detection function. The fourth network relay device accurately identifies total failure occurring in the specific network device, based on the verification. The fourth network relay device then switches over its operating status from backup to master and thus ensures continuous data communication in the network.

In any of the second to the fourth network relay devices of the invention, it is preferable that, upon identification of total failure occurring in the specific network device, the control module switches over the operating status of the network relay device from backup to master.

In the event of total failure occurring in the specific network device set in the master operating status, the operating status of the network relay device is switched over from backup to master. This arrangement prevents interruption of data communication in the network and enables continuous data communication by the network relay device of the invention.

The invention is also directed to a fifth network relay device that has multiple ports and works to relay data in a network, in combination with at least one specific network device among multiple network devices linked to the multiple ports via multiple lines. The fifth network relay device includes: a control module that receives and sends control messages from and to the specific network device via a direct link and switches over an operating status of the network relay device between master and backup; and a communication module that is under control of the control module and, in the master operating status of the network relay device, opens the multiple ports to change a connection status of the multiple lines connected with the multiple ports to logic connection and enable transmission of both messages and the data, while in the backup operating status of the network relay device, blocking the multiple ports to change the connection status of the multiple lines connected with the multiple ports to logic disconnection and enable only transmission of messages but disable transmission of the data.

In the case of detection of failure occurring on at least the direct link in the master operating status of the network relay device, the control module sends a partial failure message representing occurrence of internal partial failure via the multiple lines connected with the multiple ports to the specific network device.

In the fifth network relay device of the invention, in the case of detection of failure occurring on at least the direct link in the master operating status of the network relay device, the control module sends the partial failure message to the specific network device via the multiple lines connected with the multiple ports.

The fifth network relay device of the invention thus accurately notifies the specific network device of the occurrence of internal partial failure. The specific network device set in the backup operating status does not immediately switch over its operating status from backup to master but keeps the backup operating status. This arrangement effectively avoids the double-master state and prevents the control loop in the network.

The invention is also directed to a sixth network relay device that is connected to a pair of specific network devices via different lines and works to relay data in a network. In the case of detection of failure occurring in one of the specific network devices via one of the different lines, the sixth network relay device sends a failure occurrence message representing occurrence of the failure in one of the specific network devices to the other specific network device via the other line.

In the event of failure occurring in one of the specific network devices, the sixth network relay device notifies the other specific network device of the occurrence of the failure in one specific network device. For example, the other specific network device set in a backup operating status is notified of failure occurring in one specific network device set in a master operating status. Based on this notification, the failure occurring in the master specific network device is identifiable as total failure or partial failure.

The other objects, features, structures, and effects of the invention as well as those discussed above will become more apparent through description of the embodiments.

The technique of the invention is not restricted to the above network relay devices but is also applicable to control methods of the network relay devices. There are other diverse applications of the invention, for example, computer programs to establish the network relay devices and their control methods, recording media in which such computer programs are recorded, and data signals that include such computer programs and are embodied in carrier waves.

DESCRIPTION OF THE PREFERRED EMBODIMENTS

Some modes of carrying out the invention are described below as preferred embodiments in the following sequence. The invention is, however, not restricted to the following embodiments or their applications but may be modified, changed, and altered arbitrarily within the scope or spirit of the main characteristics of the present invention.

Figure 1:
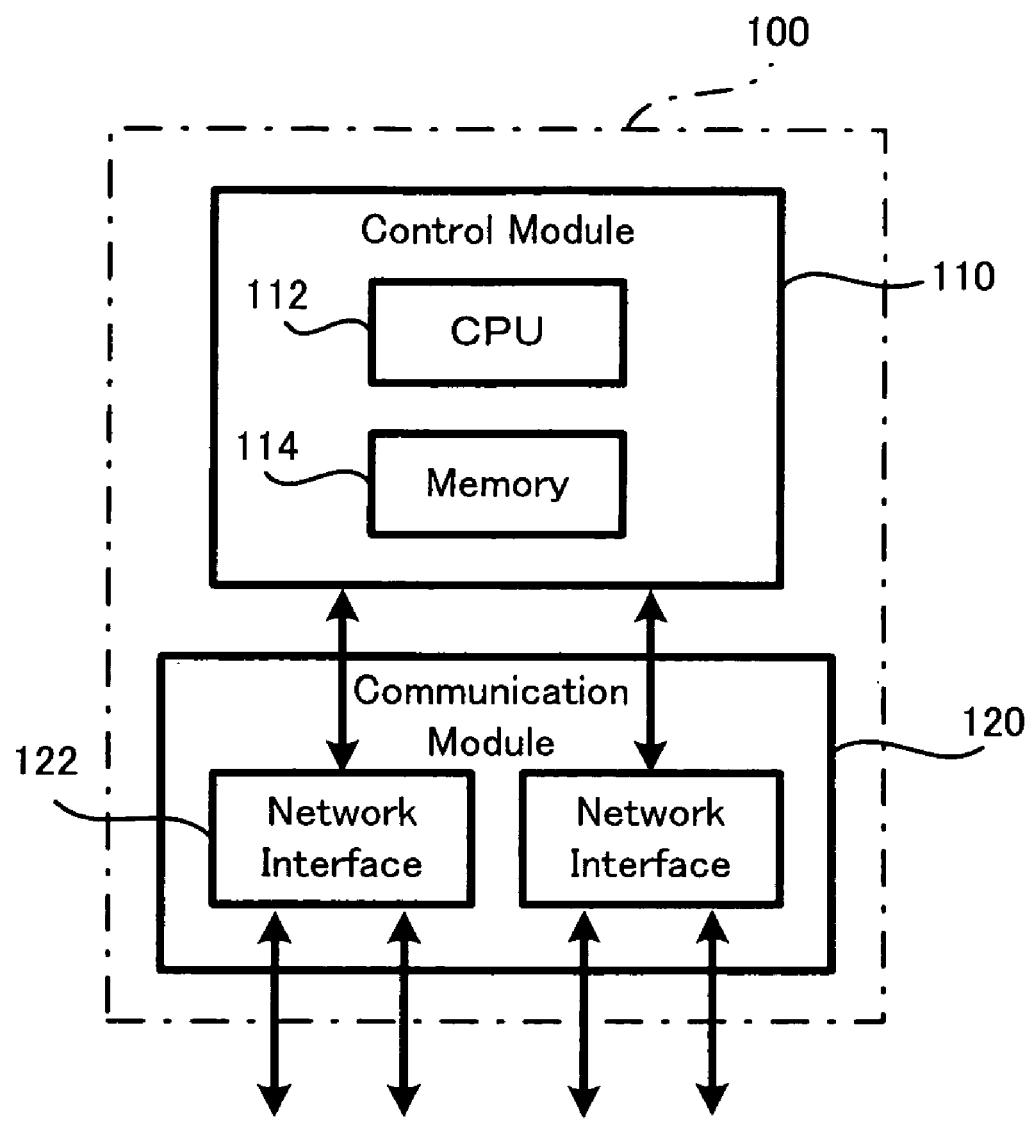
FIG. 1 is a block diagram schematically illustrating the construction of an L2 switch in one embodiment of the invention.

A. Configuration of Device
B. Operations of Device
B-1. First Embodiment
B-2. Second Embodiment
B-3. Third Embodiment
C. Modifications A. Configuration of Device FIG. 1 is a block diagram schematically illustrating the construction of an L2 switch 100 in one embodiment of the invention. As illustrated in FIG. 1, the L2 switch 100 of the embodiment mainly includes a control module 110 and a communication module 120. The control module 110 has a CPU 112 and a memory 114. The CPU 112 executes programs stored in the memory 114 to manage the operations of the whole L2 switch 100, to process control packets, and to send and receive messages. The communication module 120 has multiple network interfaces 122 and relays packets on Layer 2 (data link layer) of an OSI reference model. Each of the network interfaces 122 is connected via its port (not shown) to a line (for example, a twisted pair cable or an optical fiber cable) of, for example, Ethernet (registered trademark).

Figure 2:
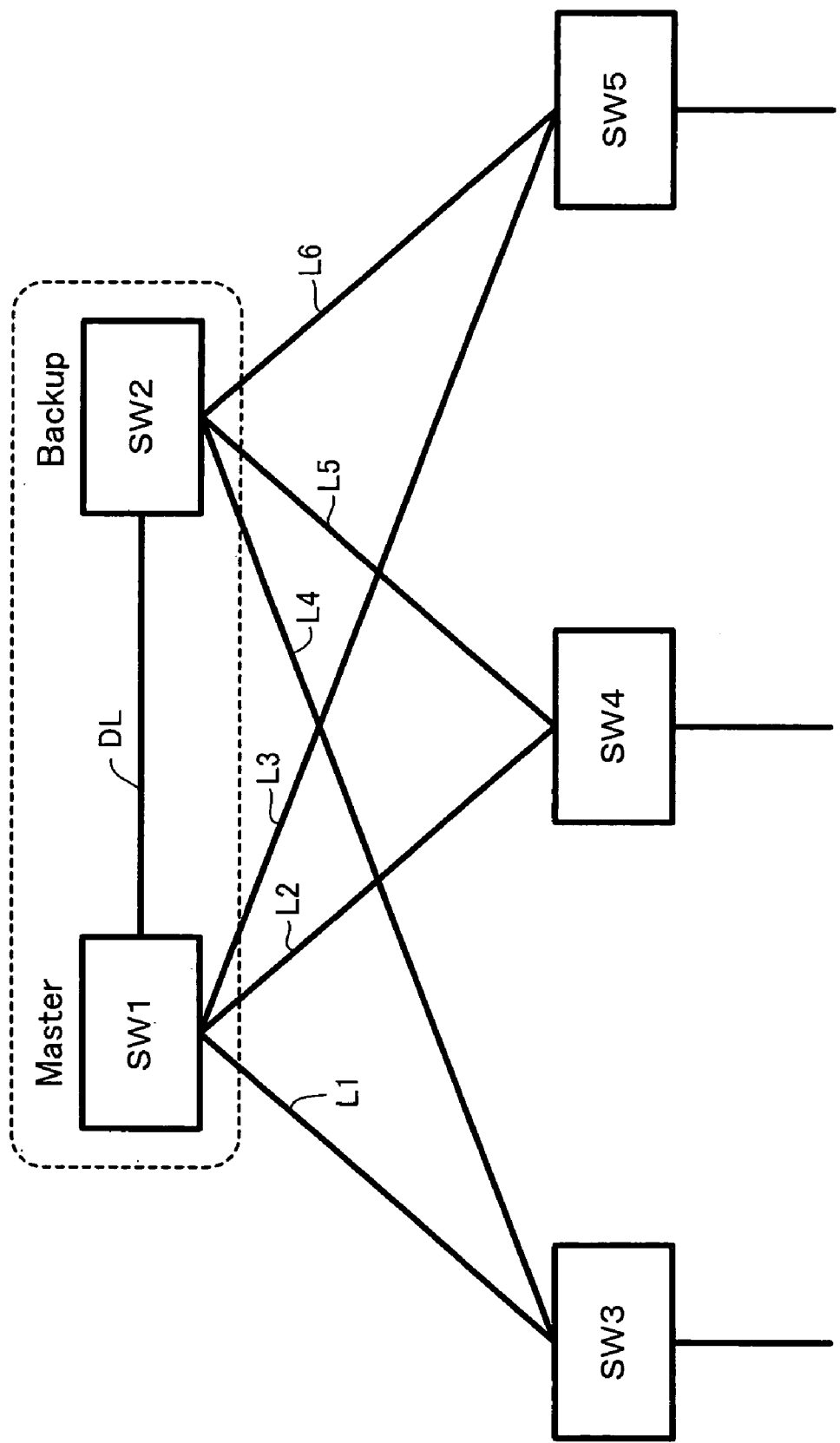
FIG. 2 shows a network with L2 switches of FIG. 1.

FIG. 2 shows a network with the L2 switches 100 of FIG. 1. As illustrated in FIG. 2, this network has two L2 switches SW1 and SW2, which work in a pair and are interconnected by a direct link DL. Both the L2 switches SW1 and SW2 are physically connected with the same three other L2 switches SW3 to SW5 by lines L1 to L6. Such connection of the L2 switches SW1 and SW2 with the three L2 switches SW3 to SW5 ensures the redundancy of the network.

In the description hereafter, the paired L2 switches SW1 and SW2 are called upstream switches, and the other three L2 switches SW3 to SW5 are called downstream switches.

Although all the L2 switches SW1 through SW5 basically have the identical structure of the L2 switch 100 shown in FIG. 1, the upstream switches SW1 and SW2 are functionally different from the downstream switches SW3 to SW5. With the purpose of discriminating the constituents of the individual L2 switches SW1 to SW5, the respective control modules 110 and the respective communication modules 120 of the L2 switches SW1 to SW5 are expressed as the control modules 110-SW1 to 110-SW5 and as the communication modules 120-SW1 to 120-SW5.

The control modules 110-SW1 and 110-SW2 of the upstream switches SW1 and SW2 mutually send and receive control messages by the direct link DL and have functions to switch over their operating statuses between Master and Backup. Namely each of the upstream switches SW1 and SW2 is set either in the Master operating status or in the Backup operating status. The control modules 110-SW3 to 110-SW5 of the downstream switches SW3 to SW5 have no such switchover functions between Master and Backup. Namely each of the downstream switches SW3 to SW5 is set neither in the Master operating status nor in the Backup operating status.

The control modules 110-SW1 and 110-SW2 of the upstream switches SW1 and SW2 intercommunicate to switch over their operating statuses between Master and Backup. One of the upstream switches SW1 and SW2 is set in the Master operating status (hereafter simply referred to as the Master) to work as the active system, while the other upstream switch SW2 or SW1 is set in the Backup operating status (hereafter simply referred to as the Backup) to work as the standby system.

Identification of the two upstream-switches SW1 and SW2 as the Master and as the Backup depends upon the number of effective ports, the priority order, and the MAC address. The number of effective ports represents the number of communicable ports, and the priority order is set in advance for each switch.

The upstream switch having the greater number of effective ports, the higher priority order, or the smaller MAC address is identified as the Master. The general procedure specifies in advance preference between the number of effective ports and the priority order. With preference to the number of effective ports, the procedure first makes comparison between the numbers of effective ports in the two upstream switches, subsequently makes comparison between their priority orders in the event of the equal numbers of effective ports, and further makes comparison between their MAC addresses in the event of the equal priority orders. With preference to the priority order, on the other hand, the procedure first makes comparison between the priority orders of the two upstream switches, subsequently makes comparison between their numbers of effective ports in the event of the equal priority orders, and further makes comparison between their MAC addresses in the event of the equal numbers of effective ports.

In the initial state in the configuration of the embodiment, the upstream switch SW1 is set as the Master and the upstream switch SW2 is set as the Backup as shown in FIG. 2.

In the upstream switch SW1 set as the Master (Master upstream switch), the communication module 120-SW1 under control of the control module 110-SW1 opens ports respectively linked to the downstream switches SW3 to SW5 and sets the lines L1 to L3, which physically connect the downstream switches SW3 to SW5 to the upstream switch SW1, in logical connection to enable reception and transmission of data from and to the downstream switches SW3 to SW5.

In the upstream switch SW2 set as the Backup (Backup upstream switch), on the other hand, the communication module 120-SW2 under control of the control module 110-SW2 blocks ports respectively linked to the downstream switches SW3 to SW5 and sets the lines L4 to L6, which physically connect the downstream switches SW3 to SW5 to the upstream switch SW2, in logical disconnection to disable reception and transmission of data from and to the downstream switches SW3 to SW5.

In the Master upstream switch SW1, the control module 110-SW1 detects internally-arising partial failure including a direct link failure, if any, and sends a partial failure message representing the occurrence of the internal partial failure from the normal ports linked to the downstream switches SW3 to SW5 to the other upstream switch SW2. This arrangement enables the Master upstream switch SW1, in the event of partial failure, to notify the Backup upstream switch SW2 of the occurrence of the partial failure via the communication path other than the direct link DL.

The Backup upstream switch SW2 acquires these functions of the Master upstream switch SW1 after the switchover of its operating status from Backup to Master.

The downstream switches may have or may not have a function of detecting failure occurring in the upstream switch (hereafter referred to as the upstream switch failure detection function). The control module having the upstream switch failure detection function detects failure occurring in the Master upstream switch SW1 via the line connecting with the Master upstream switch SW1 and sends a failure occurrence message representing the occurrence of the failure in the Master upstream switch SW1 to the Backup upstream switch SW2.

The downstream switch with this upstream switch failure detection function thus notifies the Backup upstream switch SW2 of the failure occurring in the Master upstream switch SW1.

In the description hereof, among the downstream switches, those with the upstream switch failure detection function are called the function-equipped switches and are expressed as SW3, SW4, and SW5. The downstream switches without the upstream switch failure detection function are called the functionless switches and are expressed as SW3', SW4', and SW5'.

B. Operations of Device

Before the operations of the upstream switches SW1 and SW2, the operator sets the types of the respective downstream switches, which are connected to the ports of the upstream switches SW1 and SW2 via the lines L1 to L6, as one piece of setting information into the memories 114 in the control modules 110-SW1 and 110-SW2 of the upstream switches SW1 and SW2. The types are set to enable at least distinction between the function-equipped switches and the functionless switches. On the start of the operations of the upstream switches SW1 and SW2, the control modules 110-SW1 and 110-SW2 identify the types of the respective downstream switches, which are connected to the ports of the upstream switches SW1 and SW2 by the lines L1 to L6, and specify the numbers of the respective identified types, based on the setting information.

The network has one of the three configurations according to the types of the downstream switches. In the first configuration given as a first embodiment, all the downstream switches are the function-equipped switches. In the second configuration given as a second embodiment, the downstream switches include both the function-equipped switches and the functionless switches. In the third configuration given as a third embodiment, all the downstream switches are the functionless switches.

The description regards a series of control operations in the event of partial failure occurring in the Master upstream switch SW1 including a direct link failure. The three different network configurations have some differences in these control operations and are thus separately described.

B-1. First Embodiment

In the configuration of the first embodiment, all the downstream switches are the function-equipped switches SW3 to SW5. On the start of the operations of the upstream switches SW1 and SW2, the control modules 110-SW1 and 110-SW2 refer to the setting information and identify the types of the respective downstream switches linked to the ports of the upstream switches SW1 and SW2 by the lines L1 to L6. In the first embodiment, the control modules 110-SW1 and 110-SW2 identify connection of three function-equipped switches and no functionless switch as the downstream switches.

During the operations, the Master upstream switch SW1 and the Backup upstream switch SW2 exchange control messages at regular intervals via the direct link DL to verify the mutual survivals. In the event of partial failure occurring in the Master upstream switch SW1 including a direct link failure, the control module 110-SW2 of the Backup upstream switch SW2 detects the failure on the direct link DL and starts a failure action control process shown in the flowchart of FIG. 3.

Figure 3:
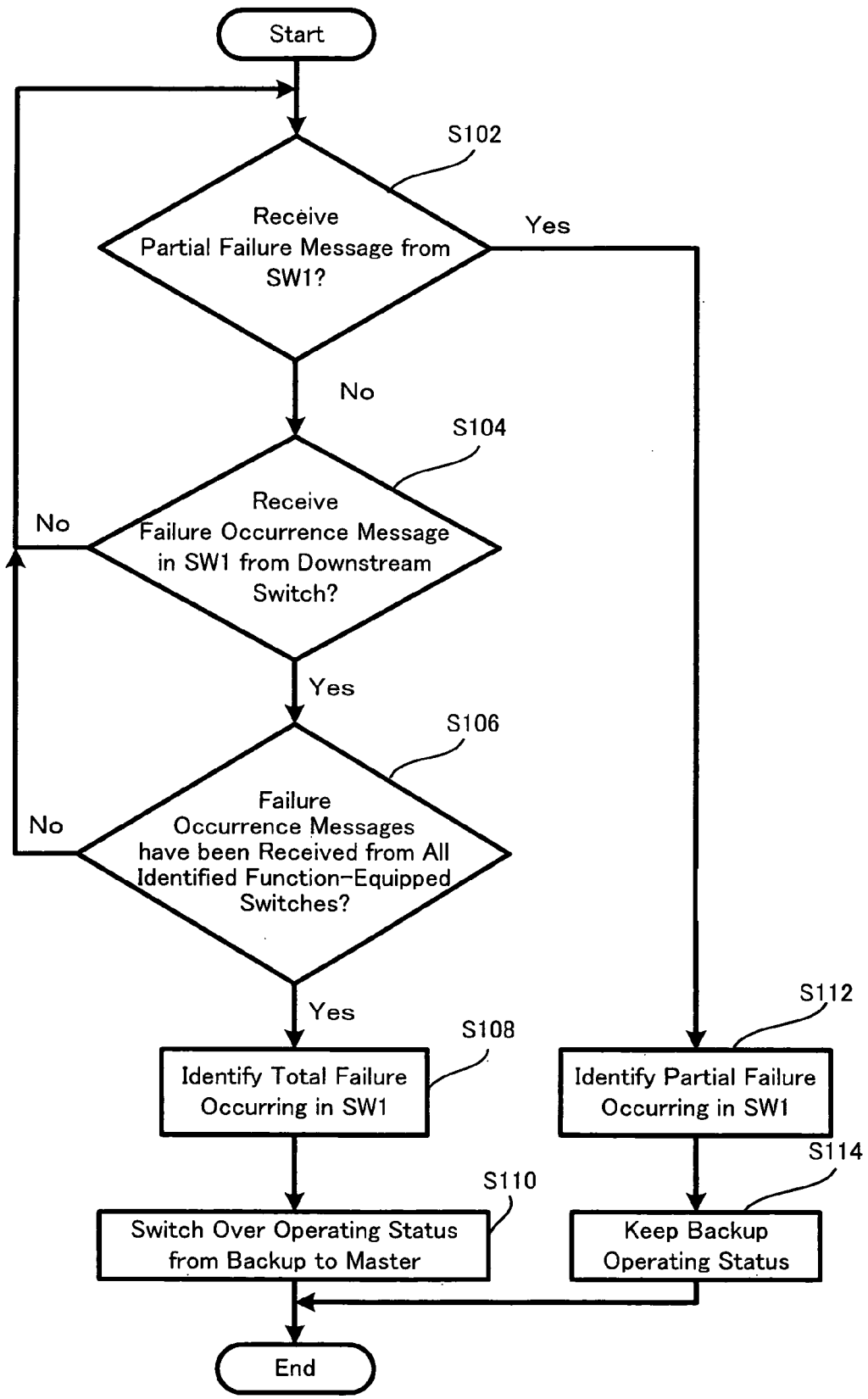
FIG. 3 is a flowchart showing a failure action control process executed by a Backup upstream switch in the configuration of a first embodiment.

FIG. 3 is a flowchart showing the failure action control process executed by the Backup upstream switch SW2 in the first embodiment.

Figure 4:
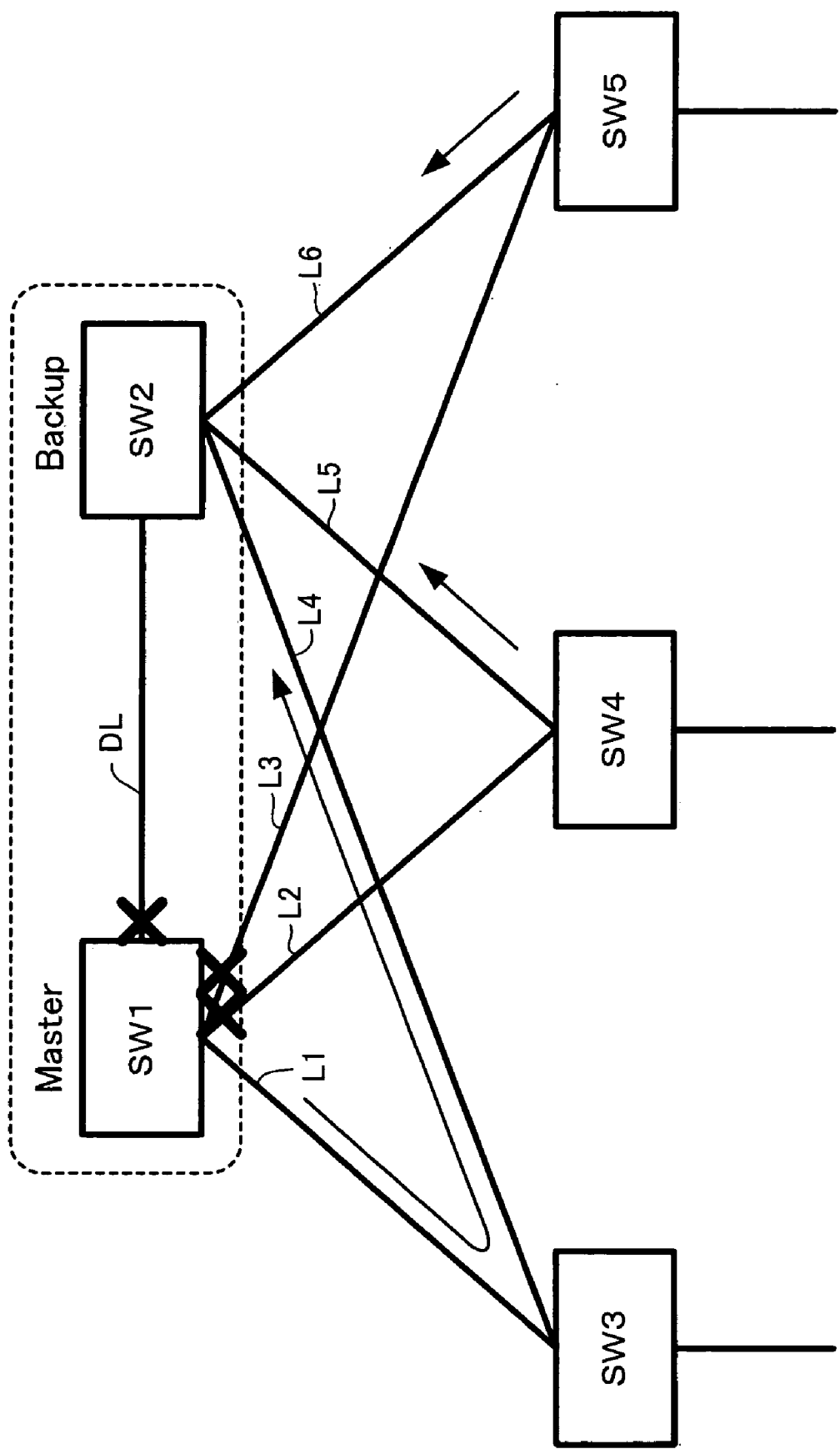
FIG. 4 shows partial failure occurring in a Master upstream switch in the configuration of the first embodiment.

The control operations in the event of partial failure occurring in the Master upstream switch SW1 are described with reference to an example of FIG. 4. In the illustrated example of FIG. 4, the Master upstream switch SW1 has a direct link failure as well as failures in the ports linked to the downstream switches SW4 and SW5, although still functioning itself and having the normal port linked to the downstream switch SW3.

In the event of partial failure occurring in the Master upstream switch SW1, the control module 110-SW1 of the Master upstream switch SW1 detects the partial failure and sends a partial failure message representing the occurrence of internal failure from the normal port linked to the downstream switch SW3 to the other upstream switch, that is, the Backup upstream switch SW2. The partial failure message sent from the normal port reaches the downstream switch SW3 via the line L1.

The control module 110-SW3 of the downstream switch SW3 identifies the expected receiver of the partial failure message as the Backup upstream switch SW2 and sends the partial failure message to the Backup upstream switch SW2 via the line L4.

In the configuration of the first embodiment, all the downstream switches SW3 to SW5 are identified as the function-equipped switches. In the event of failures occurring in the ports of the Master upstream switch SW1 linked to the downstream switches SW4 and SW5, the control modules 110-SW4 and 110-SW5 of the downstream switches SW4 and SW5 detect the failures via the lines L2 and L3 and send failure occurrence messages representing the occurrence of the failures in the Master upstream switch SW1 to the Backup upstream switch SW2 via the lines L5 and L6.

In the failure action control process of FIG. 3, the control module 110-SW2 of the Backup upstream switch SW2 determines whether the partial failure message is received from the Master upstream switch SW1 (step S102). In the illustrated example of FIG. 4, the control module 110-SW2 of the Backup upstream switch SW2 receives the partial failure message sent from the Master upstream switch SW1 via the downstream switch SW3. The control module 110-SW2 of the Backup upstream switch SW2 accordingly identifies partial failure occurring in the Master upstream switch SW1 (step S112) and keeps the Backup operating status of the Backup upstream switch SW2 without a switchover to the Master operating status (step S114).

Figure 5:
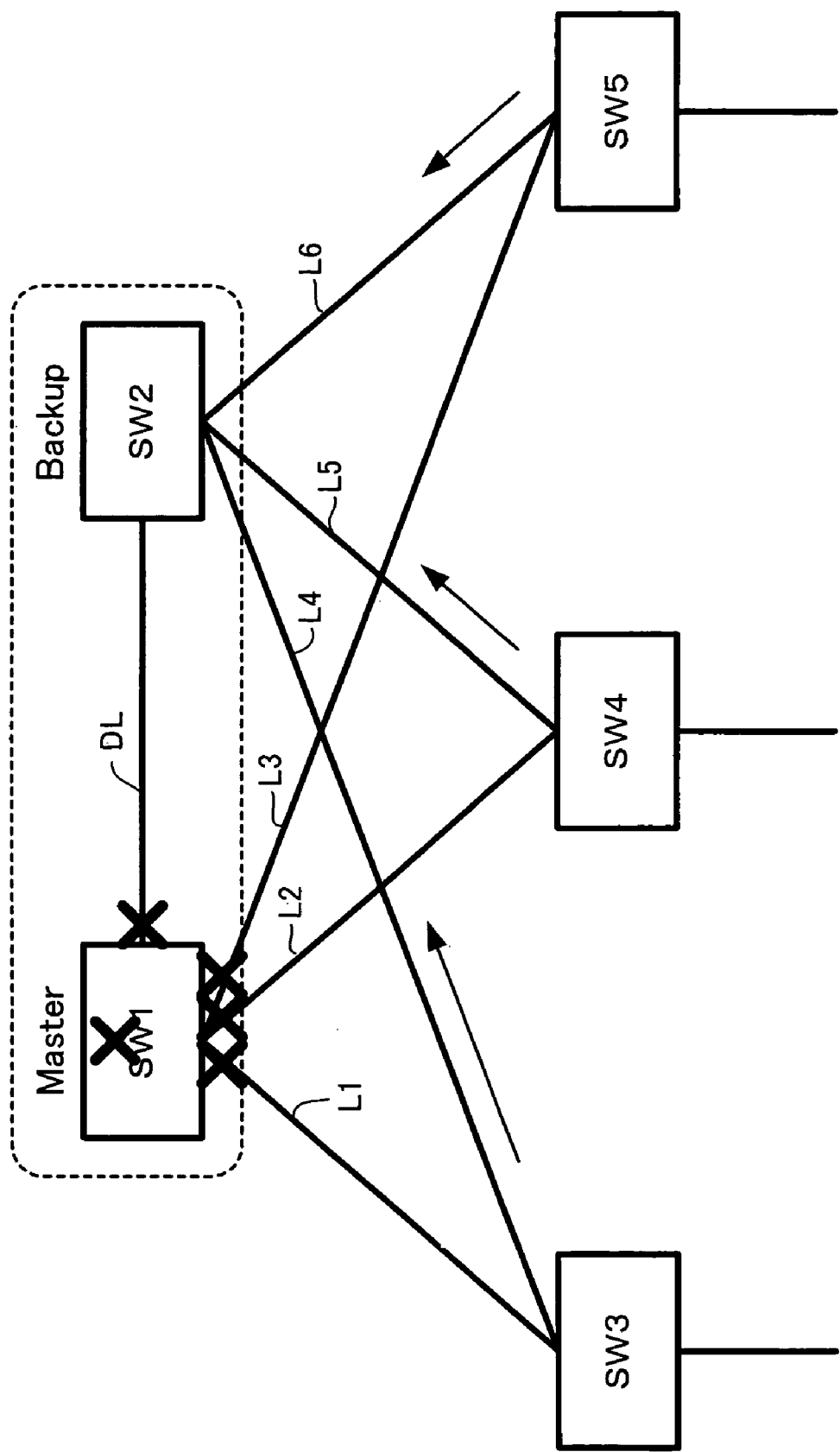
FIG. 5 shows total failure occurring in the Master upstream switch in the configuration of the first embodiment.

The control operations in the event of total failure occurring in the Master upstream switch SW1 are described with reference to an example of FIG. 5. In the illustrated example of FIG. 5, the Master upstream switch SW1 totally malfunctions and has a direct link failure as well as failures in all the ports linked to the downstream switches SW3 to SW5.

In the configuration of the first embodiment, all the downstream switches SW3 to SW5 are identified as the function-equipped switches. In the event of failure occurring in the Master upstream switch SW1, the control modules 110-SW3 to 110-SW5 of the downstream switches SW3 to SW5 detect the failure via the respective lines L1 to L3 and send failure occurrence messages representing the occurrence of the failure in the Master upstream switch SW1 to the Backup upstream switch SW2 via the lines L4 to L6.

In the failure action control process of FIG. 3, the control module 110-SW2 of the Backup upstream switch SW2 determines whether the partial failure message is received from the Master upstream switch SW1 (step S102). In the illustrated example of FIG. 5, the control module 110-SW2 of the Backup upstream switch SW2 does not receive the partial failure message from the Master upstream switch SW1. The processing flow then goes to step S104.

At step S104, the control module 110-SW2 determines whether the failure occurrence message representing the occurrence of failure in the Master upstream switch SW1 is received from any of the downstream switches. The processing flow goes back to step S102 upon no reception of the failure occurrence message from any of the downstream switches. In the illustrated example of FIG. 5, the control module 110-SW2 receives the failure occurrence messages sent from the downstream switches SW3 to SW5. The processing flow then goes to step S106.

At step S106, the control module 110-SW2 determines whether the failure occurrence messages have been received from all the identified function-equipped switches. This determines whether all the downstream switches identified as the function-equipped switches and linked to the ports of the Master upstream switch SW1 have sent the failure occurrence messages to the Backup upstream switch SW2. When the number of the received failure occurrence messages is less than the number of the identified function-equipped switches, the processing flow goes back to step S102. In the illustrated example of FIG. 5, the control module 110-SW2 of the Backup upstream switch SW2 has received the three failure occurrence messages from all the three downstream switches SW3 to SW5 identified as the function-equipped switches. The control module 110-SW2 of the Backup upstream switch SW2 accordingly identifies total failure occurring in the Master upstream switch SW1 (step S108) and switches over the operating status of the Backup upstream switch SW2 from Backup to Master (step S110). The communication module 120-SW2 under control of the control module 110-SW2 opens the blocked ports and changes the connection status of the physically connected lines from the logic disconnection to the logic connection to enable data communication.

As described above, in the event of partial failure occurring in the Master upstream switch SW1, the Master upstream switch SW1 sends a partial failure message representing the occurrence of partial failure to the Backup upstream switch SW2 via the downstream switches. The Backup upstream switch SW2 receiving the partial failure message is thus notified of the partial failure occurring in the Master upstream switch SW1 and keeps its Backup operating status. This arrangement effectively prevents the double-master state and well avoids the control loop in the network.

In the event of total failure occurring in the Master upstream switch SW1, on the other hand, the downstream switches all identified as the function-equipped switches detect the failure occurring in the Master upstream switch SW1 and send failure occurrence messages to the Backup upstream switch SW2. The Backup upstream switch SW2 verifies transmission of the failure occurrence messages from all the identified function-equipped switches, identifies total failure occurring in the Master upstream switch SW1, and switches over its operating status from Backup to Master. This arrangement enables data communication in the network using the upstream switch SW2 set as the new Master and thus effectively prevents the accidental stop of data communication in the network.

B-2. Second Embodiment

In the configuration of the second embodiment, the downstream switches include the function-equipped switches SW3 and SW5 and the functionless switch SW4'. On the start of the operations of the upstream switches SW1 and SW2, the control modules 110-SW1 and 110-SW2 refer to the setting information and identify the types of the respective downstream switches linked to the ports of the upstream switches SW1 and SW2 by the lines L1 to L6. In the second embodiment, the control modules 110-SW1 and 110-SW2 identify connection of two function-equipped switches and one functionless switch as the downstream switches.

Figure 6:
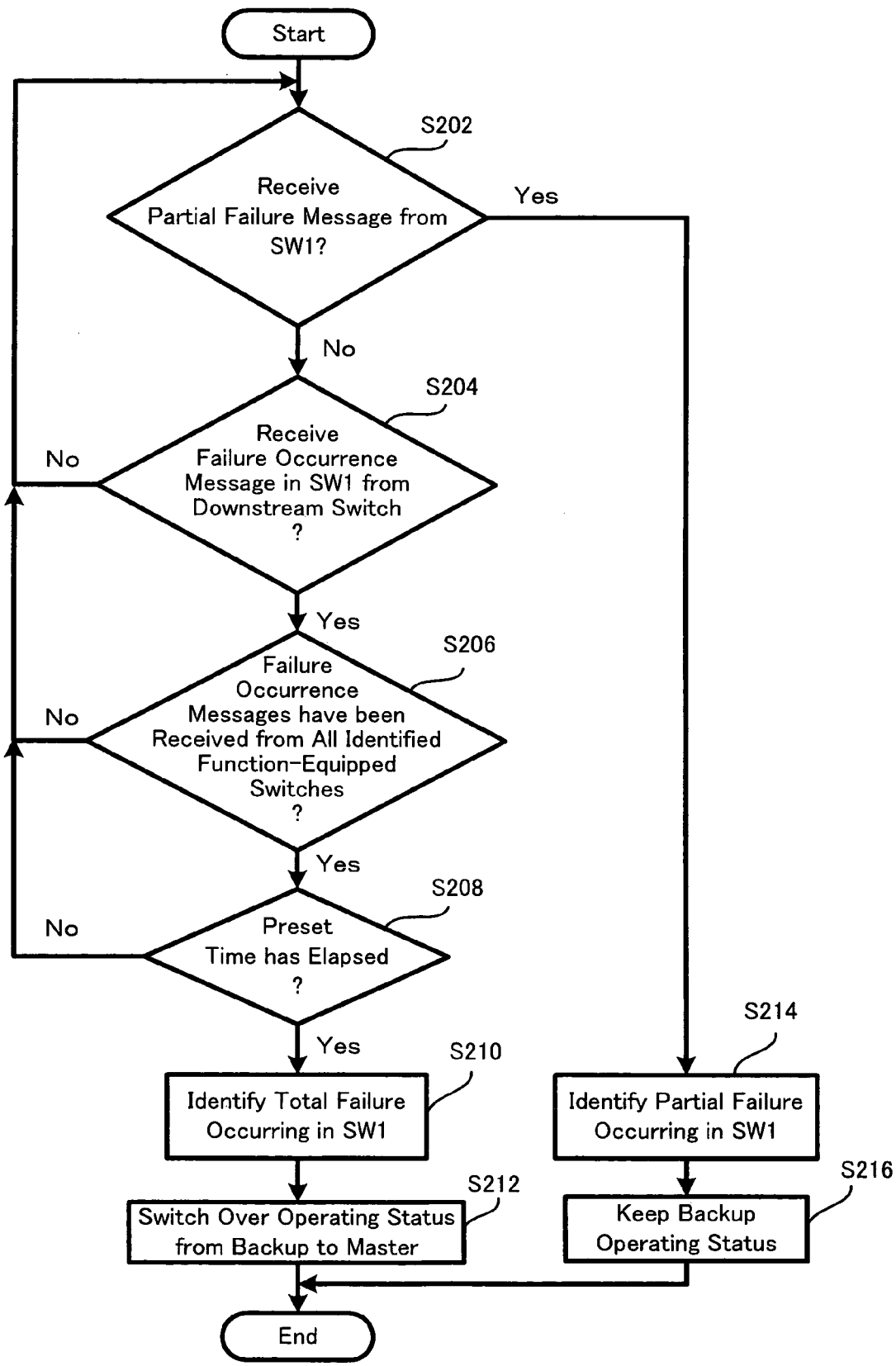
FIG. 6 is a flowchart showing a failure action control process executed by the Backup upstream switch in the configuration of a second embodiment.

During the operations, in the event of partial failure occurring in the Master upstream switch SW1 including a direct link failure, the control module 110-SW2 of the Backup upstream switch SW2 detects the failure on the direct link DL and starts a failure action control process shown in the flowchart of FIG. 6.

FIG. 6 is a flowchart showing the failure action control process executed by the Backup upstream switch SW2 in the second embodiment.

Figure 7:
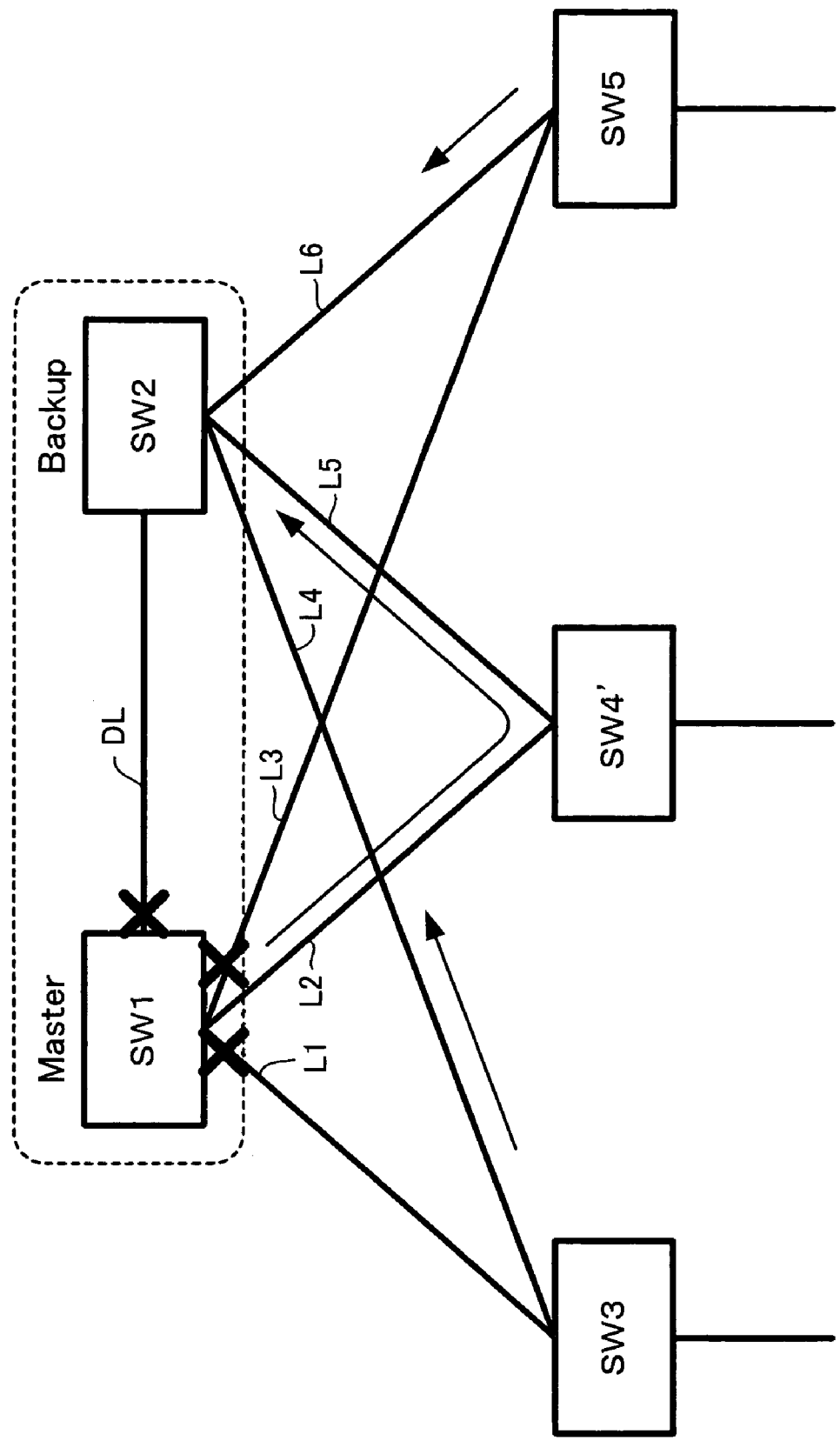
FIG. 7 shows partial failure occurring in the Master upstream switch in the configuration of the second embodiment.

The control operations in the event of partial failure occurring in the Master upstream switch SW1 are described with reference to an example of FIG. 7. In the illustrated example of FIG. 7, the Master upstream switch SW1 has a direct link failure as well as failures in the ports linked to the downstream switches SW3 and SW5, although still functioning itself and having the normal port linked to the downstream switch SW4'.

In the event of partial failure occurring in the Master upstream switch SW1, the control module 110-SW1 of the Master upstream switch SW1 detects the partial failure and sends a partial failure message representing the occurrence of internal failure from the normal port linked to the downstream switch SW4' to the other upstream switch, that is, the Backup upstream switch SW2. The partial failure message sent from the normal port reaches the downstream switch SW4' via the line L2. The control module 110-SW4' of the downstream switch SW4' identifies the expected receiver of the partial failure message as the Backup upstream switch SW2 and sends the partial failure message to the Backup upstream switch SW2 via the line L5.

In the configuration of the second embodiment, the downstream switch SW4' is identified as the functionless switch, and the downstream switches SW3 and SW5 as the function-equipped switches. In the event of failures occurring in the ports of the Master upstream switch SW1 linked to the downstream switches SW3 and SW5, the control modules 110-SW3 and 110-SW5 of the downstream switches SW3 and SW5 detect the failures via the lines L1 and L3 and send failure occurrence messages representing the occurrence of the failures in the Master upstream switch SW1 to the Backup upstream switch SW2 via the lines L4 and L6.

In the failure action control process of FIG. 6, the control module 110-SW2 of the Backup upstream switch SW2 determines whether the partial failure message is received from the Master upstream switch SW1 (step S202). In the illustrated example of FIG. 7, the control module 110-SW2 of the Backup upstream switch SW2 receives the partial failure message sent from the Master upstream switch SW1 via the downstream switch SW4'. The control module 110-SW2 of the Backup upstream switch SW2 accordingly identifies partial failure occurring in the Master upstream switch SW1 (step S214) and keeps the Backup operating status of the Backup upstream switch SW2 without a switchover to the Master operating status (step S216).

Figure 8:
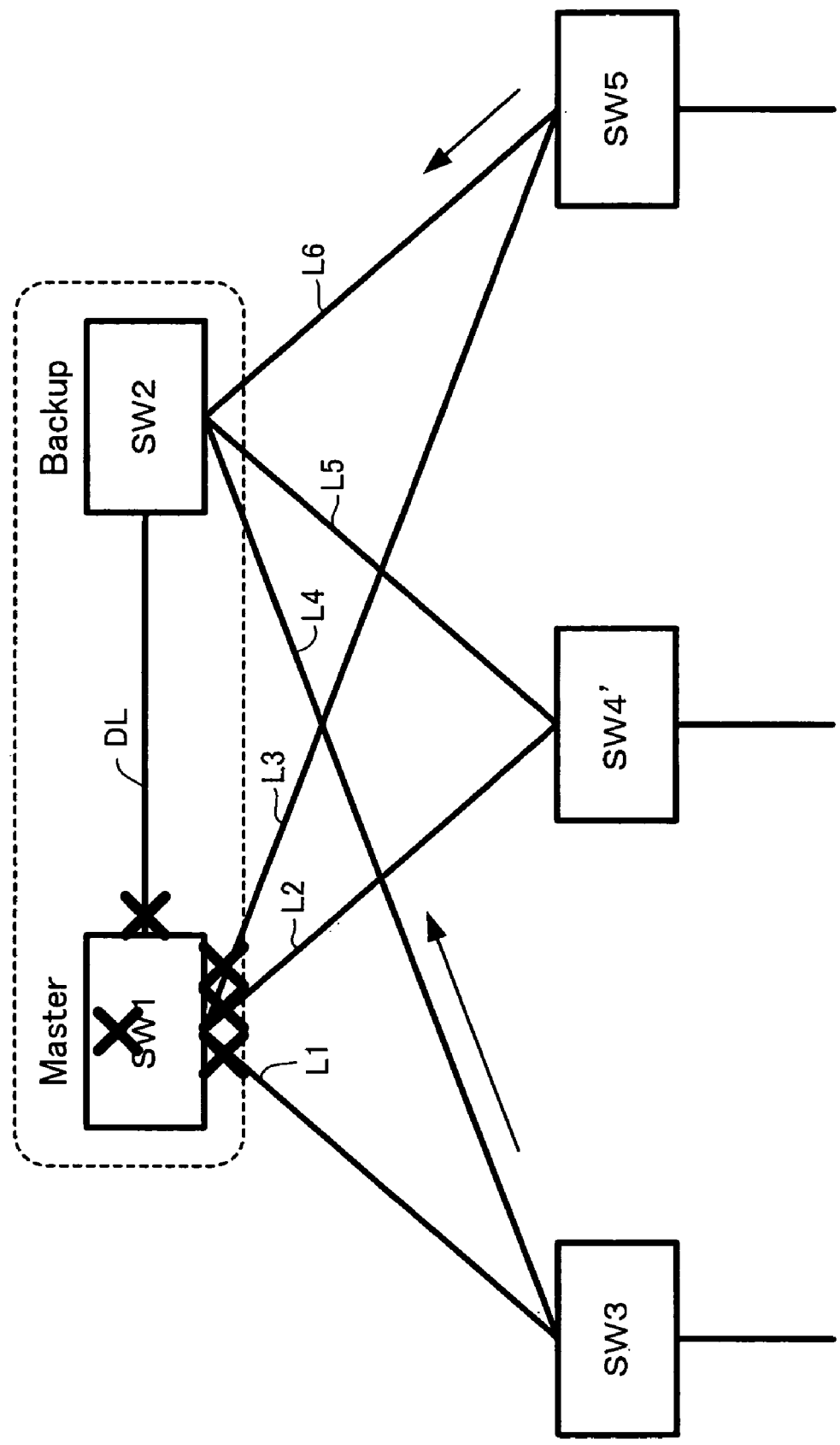
FIG. 8 shows total failure occurring in the Master upstream switch in the configuration of the second embodiment.

The control operations in the event of total failure occurring in the Master upstream switch SW1 are described with reference to an example of FIG. 8. In the illustrated example of FIG. 8, the Master upstream switch SW1 totally malfunctions and has a direct link failure as well as failures in all the ports linked to the downstream switches SW3, SW4', and SW5.

In the configuration of the second embodiment, the two downstream switches SW3 and SW5 among the three downstream switches are identified as the function-equipped switches. In the event of failure occurring in the Master upstream switch SW1, the control modules 110-SW3 and 110-SW5 of the downstream switches SW3 and SW5 detect the failure via the respective lines L1 and L3 and send failure occurrence messages representing the occurrence of the failure in the Master upstream switch SW1 to the Backup upstream switch SW2 via the lines L4 and L6.

The residual downstream switch SW4' is identified as the functionless switch. In the event of failure occurring in the Master upstream switch SW1, the control module 110-SW4' of the downstream switch SW4' neither detects the failure nor notifies the Backup upstream switch SW2 of the occurrence of the failure. Namely no message is sent from the downstream switch SW4' to the Backup upstream switch SW2.

In the failure action control process of FIG. 6, the control module 110-SW2 of the Backup upstream switch SW2 determines whether the partial failure message is received from the Master upstream switch SW1 (step S202). In the illustrated example of FIG. 8, the control module 110-SW2 of the Backup upstream switch SW2 does not receive the partial failure message from the Master upstream switch SW1. The processing flow then goes to step S204.

At step S204, the control module 110-SW2 determines whether the failure occurrence message representing the occurrence of failure in the Master upstream switch SW1 is received from any of the downstream switches. The processing flow goes back to step S202 upon no reception of the failure occurrence message from any of the downstream switches. In the illustrated example of FIG. 8, the control module 110-SW2 receives the failure occurrence messages sent from the downstream switches SW3 and SW5. The processing flow then goes to step S206.

At step S206, the control module 110-SW2 determines whether the failure occurrence messages have been received from all the identified function-equipped switches. This determines whether all the function-equipped switches among the downstream switches linked to the ports of the Master upstream switch SW1 have sent the failure occurrence messages to the Backup upstream switch SW2. When the number of the received failure occurrence messages is less than the number of the identified function-equipped switches, the processing flow goes back to step S202. In the illustrated example of FIG. 8, the control module 110-SW2 of the Backup upstream switch SW2 has received the two failure occurrence messages from the two downstream switches SW3 and SW5 identified as the function-equipped switches. The processing flow then goes to step S208.

At step S208, the control module 110-SW2 determines whether a preset time has elapsed since the start of the failure action control process of FIG. 6. The time elapsed since the start of the control process is measured by a timer (not shown). Until the preset time elapsed, the control module 110-SW2 returns the processing flow to step S202 and determines again whether the partial failure message is received from the Master upstream switch SW1. After the preset time elapsed, on the other hand, the control module 110-SW2 identifies total failure occurring in the Master upstream switch SW1 (step S210). In the event of partial failure occurring in the Master upstream switch SW1, the control module 110-SW2 of the Backup upstream switch SW2 may receive a partial failure message sent from the Master upstream switch SW1 via the downstream switch SW4' identified as the functionless switch as in the illustrated example of FIG. 7. In the event of total failure occurring in the Master upstream switch SW1, however, the control module 110-SW2 of the Backup upstream switch SW2 does not receive any message from the downstream switch SW4'. Upon no reception of any messages from the identified functionless switches within the preset time, the control module 110-SW2 of the Backup upstream switch SW2 identifies total failure occurring in the Master upstream switch SW1.

Based on the identification of total failure occurring in the Master upstream switch SW1, the control module 110-SW2 of the Backup upstream switch SW2 switches over the operating status of the Backup upstream switch SW2 from Backup to Master (step S212). The communication module 120-SW2 under control of the control module 110-SW2 opens the blocked ports and changes the connection status of the physically connected lines from the logic disconnection to the logic connection to enable data transmission.

As described above, in the event of partial failure occurring in the Master upstream switch SW1, the Master upstream switch SW1 sends a partial failure message representing the occurrence of partial failure to the Backup upstream switch SW2 via the downstream switches. The Backup upstream switch SW2 receiving the partial failure message is thus notified of the partial failure occurring in the Master upstream switch SW1 and keeps its Backup operating status. This arrangement effectively prevents the double-master state and well avoids the control loop in the network.

In the event of total failure occurring in the Master upstream switch SW1, on the other hand, the function-equipped switches among the downstream switches detect the failure occurring in the Master upstream switch SW1 and send failure occurrence messages to the Backup upstream switch SW2, while the functionless switch does not send any message to the Backup upstream switch SW2. The Backup upstream switch SW2 verifies transmission of the failure occurrence messages from all the identified function-equipped switches and no transmission of any messages from all the identified functionless switches within the preset time, identifies total failure occurring in the Master upstream switch SW1, and switches over its operating status from Backup to Master. This arrangement enables data communication in the network using the upstream switch SW2 set as the new Master and thus effectively prevents the accidental stop of data communication in the network.

B-3. Third Embodiment

In the configuration of the third embodiment, all the downstream switches are the functionless switches SW3' to SW5'. On the start of the operations of the upstream switches SW1 and SW2, the control modules 110-SW1 and 110-SW2 refer to the setting information and identify the types of the respective downstream switches linked to the ports of the upstream switches SW1 and SW2 by the lines L1 to L6. In the third embodiment, the control modules 110-SW1 and 110-SW2 identify connection of no function-equipped switch and three functionless switches as the downstream switches.

Figure 9:
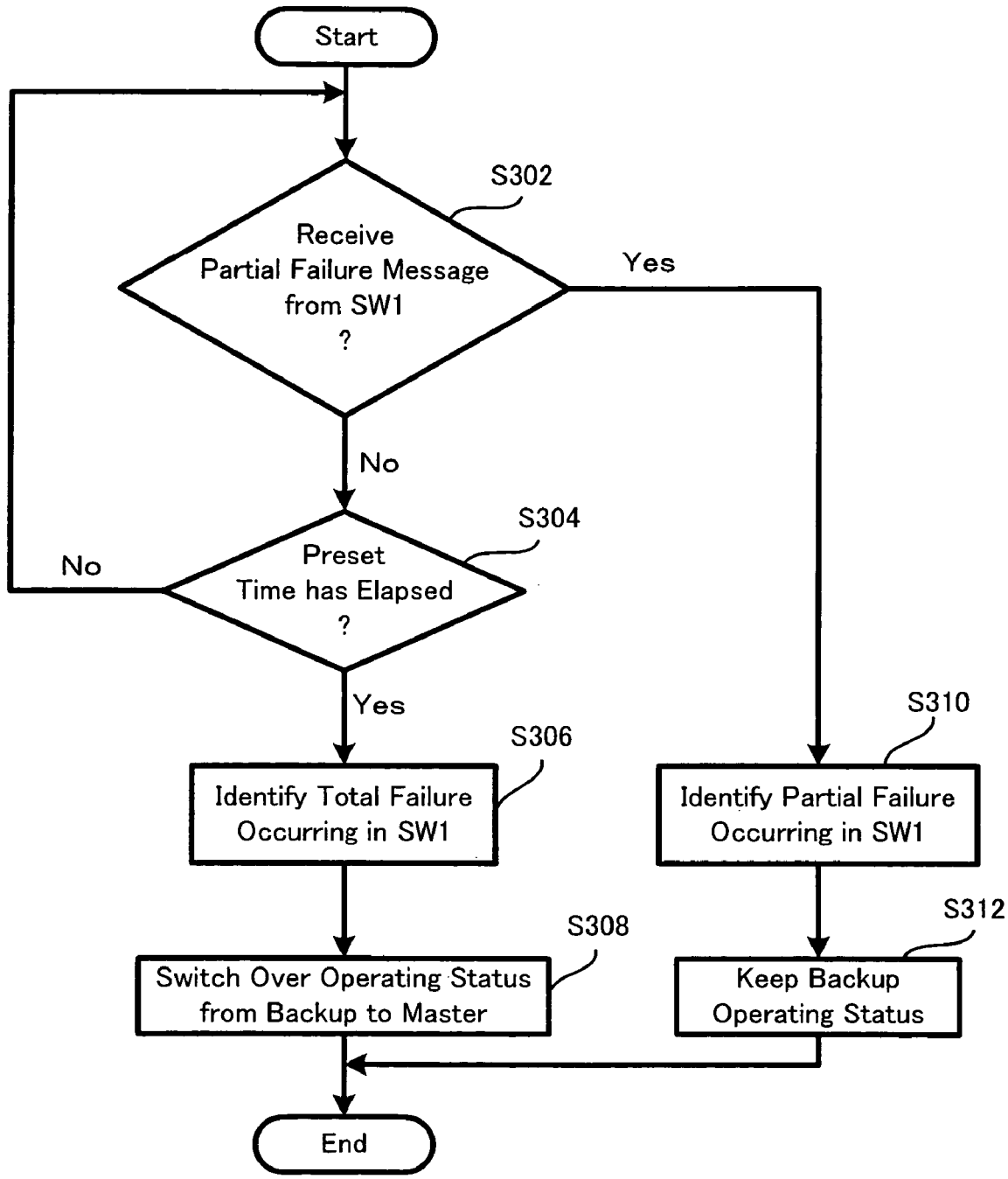
FIG. 9 is a flowchart showing a failure action control process executed by the Backup upstream switch in the configuration of a third embodiment.

During the operations, in the event of partial failure occurring in the Master upstream switch SW1 including a direct link failure, the control module 110-SW2 of the Backup upstream switch SW2 detects the failure on the direct link DL and starts a failure action control process shown in the flowchart of FIG. 9.

FIG. 9 is a flowchart showing the failure action control process executed by the Backup upstream switch SW2 in the third embodiment.

Figure 10:
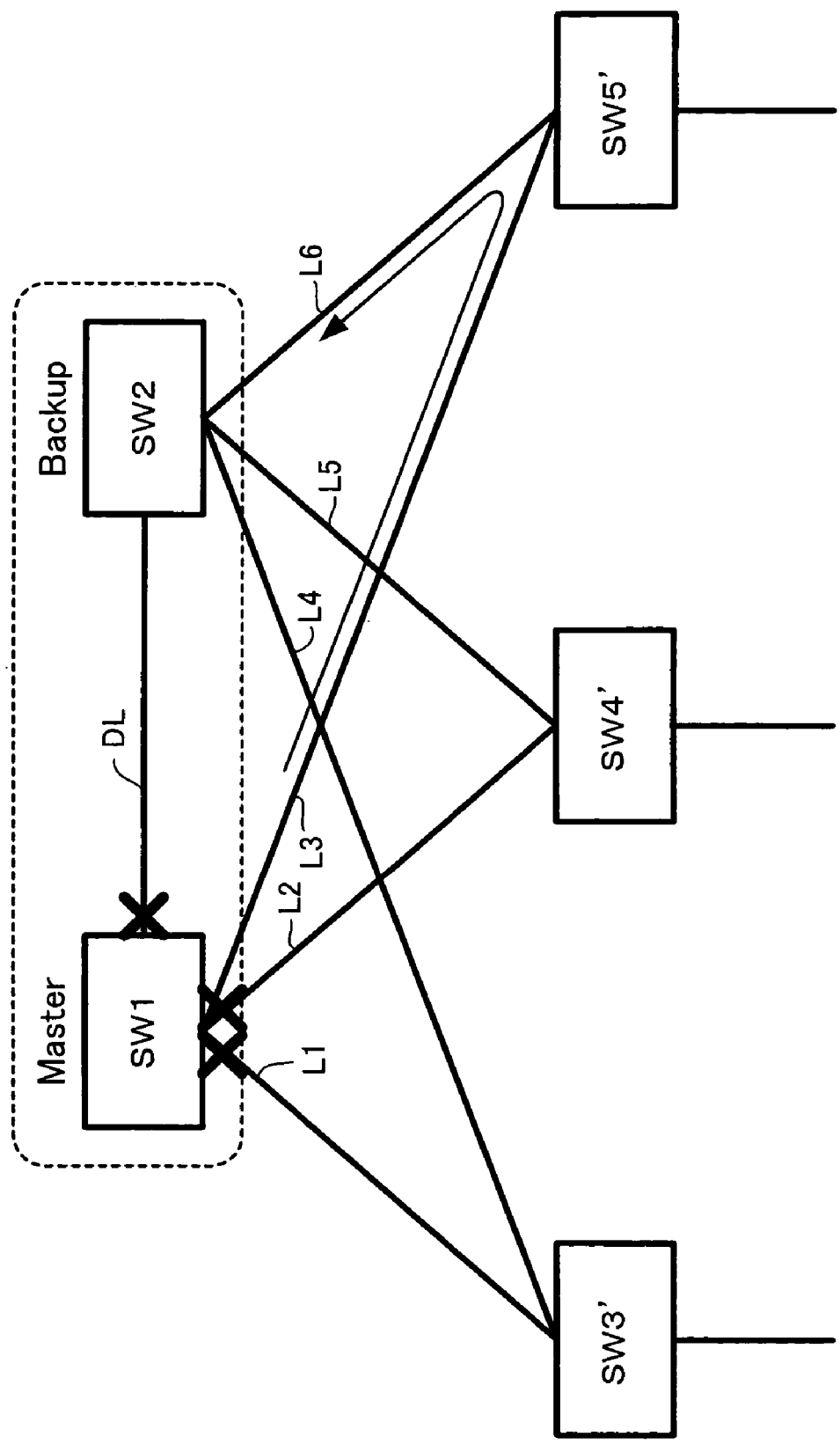
FIG. 10 shows partial failure occurring in the Master upstream switch in the configuration of the third embodiment.

The control operations in the event of partial failure occurring in the Master upstream switch SW1 are described with reference to an example of FIG. 10. In the illustrated example of FIG. 10, the Master upstream switch SW1 has a direct link failure as well as failures in the ports linked to the downstream switches SW3' and SW4', although still functioning itself and having the normal port linked to the downstream switch SW5'.

In the event of partial failure occurring in the Master upstream switch SW1, the control module 110-SW1 of the Master upstream switch SW1 detects the partial failure and sends a partial failure message representing the occurrence of internal failure from the normal port linked to the downstream switch SW5' to the other upstream switch, that is, the Backup upstream switch SW2. The partial failure message sent from the normal port reaches the downstream switch SW5' via the line L3. The control module 110-SW5' of the downstream switch SW5' identifies the expected receiver of the partial failure message as the Backup upstream switch SW2 and sends the partial failure message to the Backup upstream switch SW2 via the line L6.

In the configuration of the third embodiment, all the downstream switches SW3' to SW5' are identified as the functionless switches. In the event of failures occurring in the ports of the Master upstream switch SW1 linked to the downstream switches SW3' and SW4', neither of the downstream switches SW3' and SW4' detects the failures or notifies the Backup upstream switch SW2 of the occurrence of the failures. Namely no messages are sent from the downstream switches SW3' and SW4' to the Backup upstream switch SW2.

In the failure action control process of FIG. 9, the control module 110-SW2 of the Backup upstream switch SW2 determines whether the partial failure message is received from the Master upstream switch SW1 (step S302). In the illustrated example of FIG. 10, the control module 110-SW2 of the Backup upstream switch SW2 receives the partial failure message sent from the Master upstream switch SW1 via the downstream switch SW5'. The control module 110-SW2 of the Backup upstream switch SW2 accordingly identifies partial failure occurring in the Master upstream switch SW1 (step S310) and keeps the Backup operating status of the Backup upstream switch SW2 without a switchover to the Master operating status (step S312).

Figure 11:
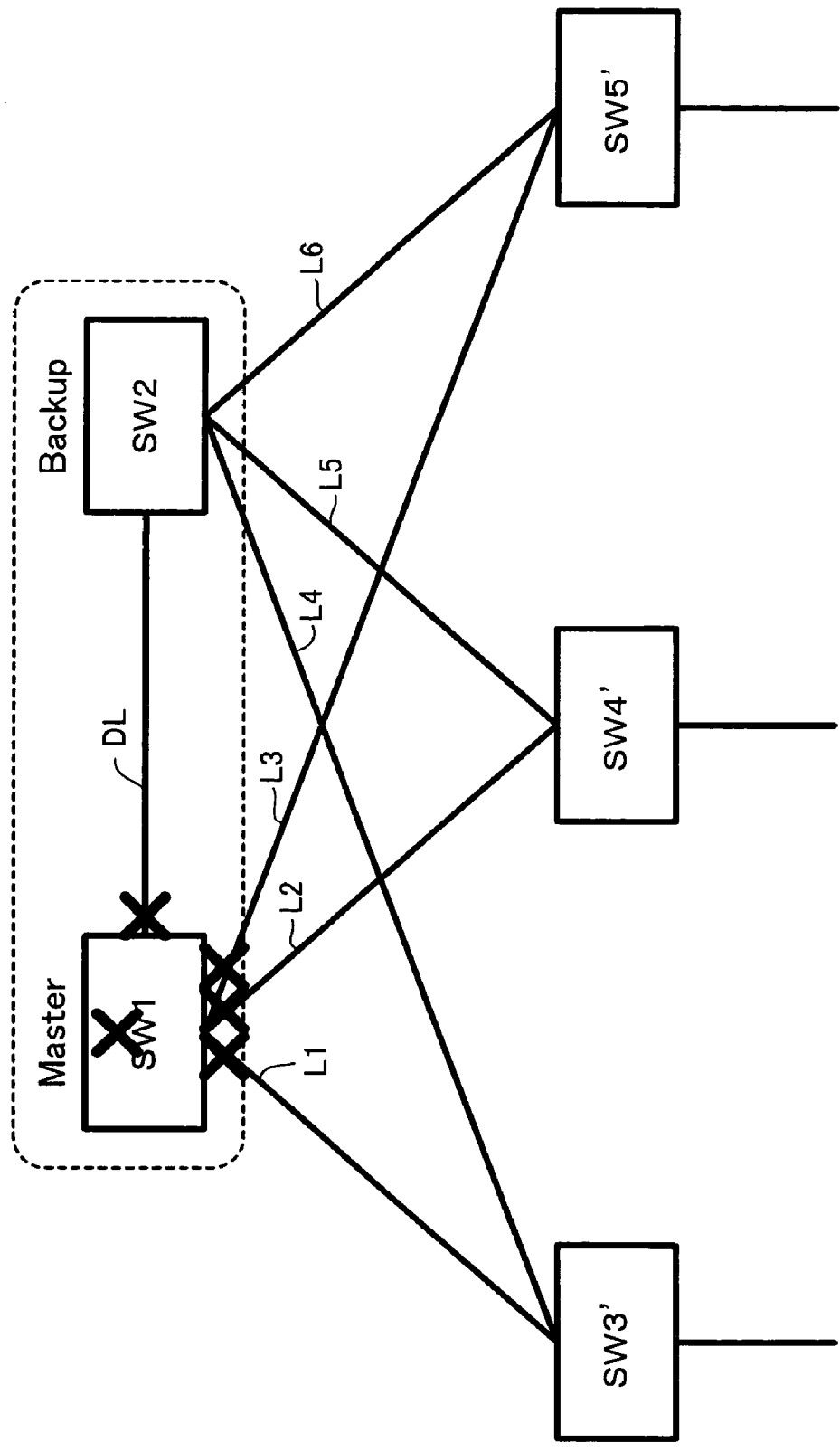
FIG. 11 shows total failure occurring in the Master upstream switch in the configuration of the third embodiment.

The control operations in the event of total failure occurring in the Master upstream switch SW1 are described with reference to an example of FIG. 11. In the illustrated example of FIG. 11, the Master upstream switch SW1 totally malfunctions and has a direct link failure as well as failures in all the ports linked to the downstream switches SW3', SW4', and SW5'.

In the configuration of the third embodiment, all the downstream switches SW3' to SW5' are identified as the functionless switches. In the event of failure occurring in the Master upstream switch SW1, none of the downstream switches SW3' to SW5' detects the failure or notifies the Backup upstream switch SW2 of the occurrence of the failure. Namely no messages are sent from the downstream switches SW3' to SW5' to the Backup upstream switch SW2.

In the failure action control process of FIG. 9, the control module 110-SW2 of the Backup upstream switch SW2 determines whether the partial failure message is received from the Master upstream switch SW1 (step S302). In the illustrated example of FIG. 11, the control module 110-SW2 of the Backup upstream switch SW2 does not receive the partial failure, message from the Master upstream switch SW1. The processing flow then goes to step S304.

At step S304, the control module 110-SW2 determines whether a preset time has elapsed since the start of the failure action control process of FIG. 9. Until the preset time elapsed, the control module 110-SW2 returns the processing flow to step S302 and determines again whether the partial failure message is received from the Master upstream switch SW1. After the preset time elapsed, on the other hand, the control module 110-SW2 identifies total failure occurring in the Master upstream switch SW1 (step S306). In the configuration of the third embodiment, all the downstream switches SW3' to SW5' are identified as the functionless switches. In the event of partial failure occurring in the Master upstream switch SW1, the control module 110-SW2 of the Backup upstream switch SW2 may receive a partial failure message sent from the Master upstream switch SW1 via at least one of the downstream switches as in the illustrated example of FIG. 10. In the event of total failure occurring in the Master upstream switch SW1, however, the control module 110-SW2 of the Backup upstream switch SW2 does not receive any messages from any downstream switches. Upon no reception of any messages from the identified functionless switches within the preset time, the control module 110-SW2 of the Backup upstream switch SW2 identifies total failure occurring in the Master upstream switch SW1.

Based on the identification of total failure occurring in the Master upstream switch SW1, the control module 110-SW2 of the Backup upstream switch SW2 switches over the operating status of the Backup upstream switch SW2 from Backup to Master (step S308). The communication module 120-SW2 under control of the control module 110-SW2 opens the blocked ports and changes the connection status of the physically connected lines from the logic disconnection to the logic connection to enable data transmission.

As described above, in the event of partial failure occurring in the Master upstream switch SW1, the Master upstream switch SW1 sends a partial failure message representing the occurrence of partial failure to the Backup upstream switch SW2 via the downstream switches. The Backup upstream switch SW2 receiving the partial failure message is thus notified of the partial failure occurring in the Master upstream switch SW1 and keeps its Backup operating status. This arrangement effectively prevents the double-master state and well avoids the control loop in the network.

In the event of total failure occurring in the Master upstream switch SW1, on the other hand, none of the downstream switches all identified as the functionless switches send any messages. The Backup upstream switch SW2 verifies no transmission of any messages from all the identified functionless switches within the preset time, identifies total failure occurring in the Master upstream switch SW1, and switches over its operating status from Backup to Master. This arrangement enables data communication in the network using the upstream switch SW2 set as the new Master and thus effectively prevents the accidental stop of data communication in the network.

C. Modifications

In any of the above embodiments, in response to identification of partial failure occurring in the Master upstream switch SW1, the Backup upstream switch SW2 keeps its Backup operating status without a switchover to the Master operating status. This is, however, not restrictive, but the failure action control process may be modified to switch over the operating status of the Backup upstream switch SW2 from Backup to Master according to the following procedure, in the event of partial failure occurring in the Master upstream switch SW1.

(1) The control module 110-SW2 of the Backup upstream switch SW2 identifies partial failure occurring in the Master upstream switch SW1 and sends a stop message to the Master upstream switch SW1 via the normal port receiving the partial failure message. The normal port receiving the partial failure message is the port linked to the downstream switch SW3 in the first embodiment, the port linked to the downstream switch SW4' in the second embodiment, and the port linked to the downstream switch SW5' in the third embodiment. The downstream switch linked to the normal port receives the stop message, identifies the expected receiver of the stop message as the Master upstream switch SW1, and sends the stop message to the Master upstream switch SW1.

(2) The control module 110-SW1 of the Master upstream switch SW1 receives the stop message and switches over its operating status from Master to Backup. The communication module 120-SW1 under control of the control module 110-SW1 blocks the open ports and changes the connection status of the physically connected lines from the logic connection to the logic disconnection to disable data transmission from and to the downstream switches. Namely the stop message sent from the upstream switch SW2 forces the Master upstream switch SW1 to switch over its operating status from Master to Backup.

(3) The control module 110-SW1 of the upstream switch SW1 having the operating status just switched over to Backup then sends a return message to the Backup upstream switch SW2 via the normal port receiving the stop message. The downstream switch linked to the normal port receives the return message, identifies the expected receiver of the return message as the Backup upstream switch SW2, and sends the return message to the Backup upstream switch SW2.

(4) The control module 110-SW2 of the Backup upstream switch SW2 receives the return message and switches over its operating status from Backup to Master. The communication module 120-SW2 under control of the control module 110-SW2 opens the blocked ports and changes the connection status of the physically connected lines from the logic disconnection to the logic connection to enable data transmission from and to the downstream switches. Namely the return message sent from the upstream switch SW1 forces the Backup upstream switch SW2 to switch over its operating status from Backup to Master.

This procedure effectively prevents the double-master state and switches over the operating status of the upstream switch SW1 from Master to Backup while switching over the operating status of the upstream switch SW2 from Backup to Master.

A further modification may allow the Backup upstream switch SW2 to specify in advance either the continuation of its Backup operating status or the switchover of its operating status from Backup to Master in response to identification of partial failure occurring in the Master upstream switch SW1.

In any of the embodiments described above, before the operations of the upstream switches SW1 and SW2, the operator sets the types of the respective downstream switches, which are linked to the ports of the upstream switches SW1 and SW2, as the setting information into the control modules 110-SW1 and 110-SW2 of the upstream switches SW1 and SW2. Such previous setting is, however, not essential. On the start of the operations of the upstream switches SW1 and SW2, the control modules 110-SW1 and 110-SW2 may identify the types of the downstream switches, which are linked to the ports of the upstream switches SW1 and SW2, and specify the numbers of the respective identified types.

In one possible structure of this modification, each switch may be designed to send self switch information including its type to the other switches at regular intervals. The control modules 110-SW1 and 110-SW2 of the upstream switches SW1 and SW2 receive the self switch information from the downstream switches linked to the ports of the upstream switches SW1 and SW2 and identify the types of the downstream switches based on the received self switch information. In another possible structure of this modification, the control modules 110-SW1 and 110-SW2 of the upstream switches SW1 and SW2 send inquiries to the downstream switches linked to the ports of the upstream switches SW1 and SW2 and identify the types of the respective downstream switches based on the responses to the inquiries.

In the second and the third embodiments, the time elapsed is counted from the start of the failure action control process. This is, however, not restrictive at all. The time elapsed may be counted from any other predetermined reference timing.

The technique of the invention is applicable to virtual LANs established in a network. In each group of a single virtual LAN or of multiple virtual LANs, the control modules of upstream switches used in a pair exchange control messages, make comparison between the numbers of effective ports and between the priority orders of the upstream switches, and switch over their operating statuses between Master and Backup. The respective communication modules of the upstream switches open and block the ports in each group to enable and disable data communication in the group of the single virtual LAN or the multiple virtual LANs. While the upstream switch SW1 and the upstream switch SW2 are set respectively as Master and as Backup in one group of virtual LANs, the upstream switch SW1 and the upstream switch SW2 may be set respectively as Backup and as Master in another group of virtual LANs.

Such management and control in each group of a single virtual LAN or of multiple virtual LANs effectively prevents the double-master state in the group and avoids the loop in each virtual LAN.

The above embodiments regard the application of the invention to the L2 switch as one network relay device. The technique of the invention is, however, not restricted to the L2 switches but may be applied to L3 switches, routers, and any other network relay devices having the switchover function of the operating status between Master and Backup.

The technique of the invention is attainable by any of control methods of the network relay device described below.

(1) The invention is directed to a control method of controlling a network relay device hat has multiple ports and works to relay data in a network, in combination with at least one specific network device among multiple network devices linked to the multiple ports via multiple lines. The control method includes the steps of: (a) receiving and sending control messages from and to the specific network device via a direct link; (b) switching over an operating status of the network relay device between master and backup; and (c) in the master operating status of the network relay device, setting a connection status of the multiple lines connected with the multiple ports to logic connection to enable transmission of both messages and the data, and in the backup operating status of the network relay device, setting the connection status of the multiple lines connected with the multiple ports to logic disconnection to enable only transmission of messages but disable transmission of the data.

The step (b) includes the sub-steps of: (b-1) in the case of detection of failure on the direct link in the backup operating status of the network relay device, verifying reception of a partial failure message representing occurrence of partial failure in the specific network device from the specific network device via any of the multiple lines linked to the multiple ports; and (b-2) identifying partial failure occurring in the specific network device, based on the verification.

(2) The invention is also directed to a control method of controlling a network relay device hat has multiple ports and works to relay data in a network, in combination with at least one specific network device among multiple network devices linked to the multiple ports via multiple lines. The control method includes the steps of: (a) receiving and sending control messages from and to the specific network device via a direct link; (b) switching over an operating status of the network relay device between master and backup; and (c) in the master operating status of the network relay device, setting a connection status of the multiple lines connected with the multiple ports to logic connection to enable transmission of both messages and the data, and in the backup operating status of the network relay device, setting the connection status of the multiple lines connected with the multiple ports to logic disconnection to enable only transmission of messages but disable transmission of the data.

The step (b) includes the sub-steps of: (b-1) in the backup operating status of the network relay device, identifying each of the multiple network devices as either of a first network device with a failure detection function that detects failure occurring in the specific network device and a second network device without the failure detection function and specifying number of the identified first network devices and number of the identified second network devices; (b-2) in the case of detection of failure on the direct link under the condition that the specified number of the second network devices is equal to zero, verifying reception of a failure occurrence message representing occurrence of a failure in the specific network device from all the specified number of the identified first network devices via the multiple lines connected to the multiple ports; and (b-3) identifying total failure occurring in the specific network device, based on the verification.

(3) The invention is further directed to a control method of controlling a network relay device hat has multiple ports and works to relay data in a network, in combination with at least one specific network device among multiple network devices linked to the multiple ports via multiple lines. The control method includes the steps of: (a) receiving and sending control messages from and to the specific network device via a direct link; (b) switching over an operating status of the network relay device between master and backup; and (c) in the master operating status of the network relay device, setting a connection status of the multiple lines connected with the multiple ports to logic connection to enable transmission of both messages and the data, and in the backup operating status of the network relay device, setting the connection status of the multiple lines connected with the multiple ports to logic disconnection to enable only transmission of messages but disable transmission of the data.

The step (b) includes the sub-steps of (b-1) in the backup operating status of the network relay device, identifying each of the multiple network devices as either of a: first network device with a failure detection function that detects failure occurring in the specific network device and a second network device without the failure detection function and specifying number of the identified first network devices and number of the identified second network devices; (b-2) in the case of detection of failure on the direct link under the condition that the specified number of the first network devices is equal to zero, verifying reception of no message from any of the multiple network devices via any of the multiple lines connected to the port within a preset time elapsed since a predetermined reference timing; and (b-3) identifying total failure occurring in the specific network device, based on the verification.

(4) The invention is also directed to a control method of controlling a network relay device hat has multiple ports and works to relay data in a network, in combination with at least one specific network device among multiple network devices linked to the multiple ports via multiple lines. The control method includes the steps of: (a) receiving and sending control messages from and to the specific network device via a direct link; (b) switching over an operating status of the network relay device between master and backup; and (c) in the master operating status of the network relay device, setting a connection status of the multiple lines connected with the multiple ports to logic connection to enable transmission of both messages and the data, and in the backup operating status of the network relay device, setting the connection status of the multiple lines connected with the multiple ports to logic disconnection to enable only transmission of messages but disable transmission of the data.

The step (b) includes the sub-steps of (b-1) in the backup operating status of the network relay device, identifying each of the multiple network devices as either of a first network device with a failure detection function that detects failure occurring in the specific network device and a second network device without the failure detection function and specifying number of the identified first network devices and number of the identified second network devices; (b-2) in the case of detection of failure on the direct link, verifying reception of a failure occurrence message representing occurrence of failure in the specific network device from all the specified number of the identified first network devices via lines connected to the first network devices among the multiple lines connected to the multiple ports and reception of no message via residual lines other than the lines connected to the identified first network devices within a preset time elapsed since a predetermined reference timing; and (b-3) identifying total failure occurring in the specific network device, based on the verification.

What is claimed is:

1. A network relay device that has a direct link and multiple ports, and works to relay data in a network, in combination with at least one specific network device among multiple network devices linked to the multiple ports via multiple lines, the network relay device comprising:

a control module that receives and sends control messages from and to the specific network device via the direct link and switches over an operating status of the network relay device between master and backup; and a communication module that is under control of the control module and, in the master operating status of the network relay device, sets a connection status of the multiple lines connected with the multiple ports to logic connection to enable transmission of both messages and the data, while in the backup operating status of the network relay device, setting the connection status of the multiple lines connected with the multiple ports to logic disconnection to enable only transmission of messages but disable transmission of the data, in the case of detection of failure on the direct link in the backup operating status of the network relay device, the control module verifying reception of a partial failure message representing occurrence of partial failure in the specific network device from the specific network device via any of the multiple lines linked to the multiple ports and identifying partial failure occurring in the specific network device, wherein upon identification of the partial failure occurring in the specific network device, the control module sends a switchover message to the specific network device to urge a switchover of an operating status of the specific network device from master to backup via a line connected to a port receiving the partial failure message, receives a return message from the specific network device, and switches over the operating status of the network relay device from backup to master.

2. An upstream network relay device that has a direct link and multiple ports, and works to relay data in a network, in combination with at least one specific upstream network device among multiple network devices linked to the multiple ports via multiple lines, the upstream network relay device comprising:

a control module that receives and sends control messages from and to the specific upstream network device via the direct link and switches over an operating status of the network relay device between master and backup; and a communication module that is under control of the control module and, in the master operating status of the upstream network relay device, sets a connection status of the multiple lines connected with the multiple ports to logic connection to enable transmission of both messages and the data, while in the backup operating status of the upstream network relay device, setting the connection status of the multiple lines connected with the multiple ports to logic disconnection to enable only transmission of messages but disable transmission of the data, in the backup operating status of the upstream network relay device, the control module identifying each type of the multiple downstream network devices linked to the multiple ports via the multiple lines as either of a first downstream network device with a failure detection function of detecting failure occurring in the specific network device and a second downstream network device without the failure detection function and specifying number of the identified first downstream network devices and number of the identified second downstream network devices, in the case of detection of failure on the direct link under the condition that the specified number of the second downstream network devices is equal to zero, the control module verifying reception of a failure occurrence message representing occurrence of failure in the specific upstream network device from all the specified number of the identified first downstream network devices via respective lines connected to relevant ports and identifying total failure occurring in the specific upstream network device.

3. The network relay device in accordance with claim 2, wherein in the case of detection of failure on the direct line, the control module identifies total failure occurring in the specific network device when no message is received via any of the multiple lines connected to the multiple ports within a preset time elapsed since a predetermined reference timing.

4. The network relay device in accordance with claim 2, wherein upon identification of total failure occurring in the specific network device, the control module switches over the operating status of the network relay device from backup to master.

* * * * *